(No Model.)
W. BIBB.
COTTON CULTIVATOR.
No. 575,323. Patented Jan. 19, 1897.
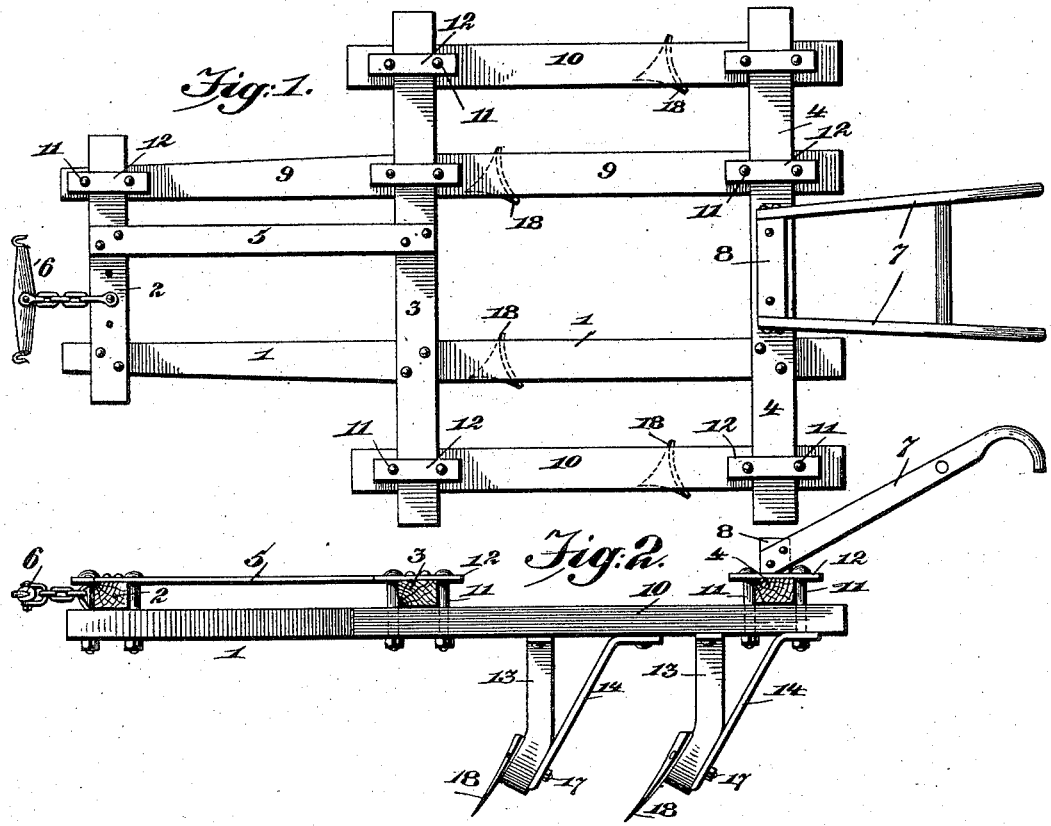
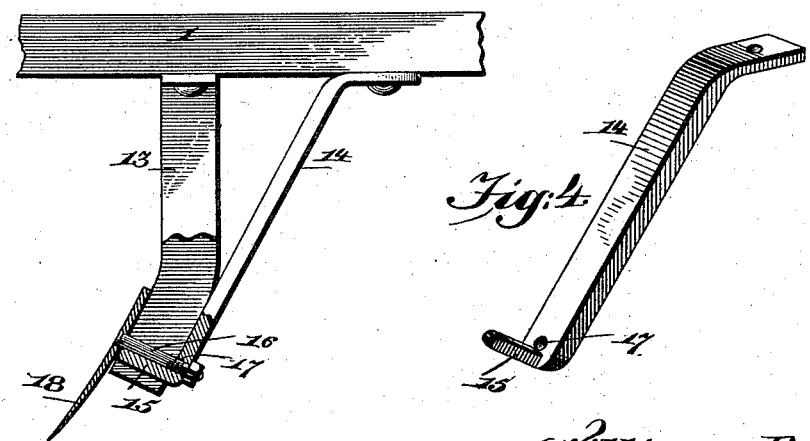
Witnesses  
H. S. Dieterich  
V. B. Hillyard
Inventor  
William Bibb  
By his Attorneys,  
C. A. Snow & Co.

UNITED STATES PATENT OFFICE.

WILLIAM BIBB, OF WESTMINSTER, SOUTH CAROLINA.

COTTON-CULTIVATOR.

SPECIFICATION forming part of Letters Patent No. 575,323, dated January 19, 1897.

Application filed October 21, 1896. Serial No. 609,581. (No model.)

*To all whom it may concern:*

Be it known that I, WILLIAM BIBB, a citizen of the United States, residing at Westminster, in the county of Oconee and State of South Carolina, have invented a new and useful Cotton-Cultivator, of which the following is a specification.

This invention aims to provide an implement for cultivating cotton or other plants which will straddle the row and enable the horse and attendant to walk in the space between adjacent rows and to one side of the row being treated.

In its construction the implement comprises a main longitudinal bar, a series of transverse bars rigidly and firmly attached to the main bar, and longitudinal bars relatively adjustable laterally to vary the distance between them and the main longitudinal bar according to the nature of the work and the distance between the rows to be cultivated.

One object of the invention is to lessen the draft, reduce the manual effort required to hold the implement to its work, and to devise a machine which will be light, durable, simple, and efficient.

Other objects are contemplated and will appear to those skilled in the use of agricultural implements as the nature of the improvement is comprehended, and to this end reference is to be had to the following description and the accompanying drawings.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a cotton or other cultivator constructed in accordance with this invention. Fig. 2 is a side elevation. Fig. 3 is a detail view of a standard and the parts connected therewith. Fig. 4 is a detail view of a brace.

Corresponding and like parts are referred to in the following description and indicated in the several views of the drawings by the same reference-characters.

The main longitudinal beam 1 is located to one side of the longitudinal center of the implement, and the transverse beams 2, 3, and 4 are firmly connected therewith and arranged in parallel relation, the beams 3 and 4 being of equal length and the front beam 2 considerably shorter. A longitudinal brace 5 is rigidly attached at its ends to the transverse beams 2 and 3 and extends parallel with the longitudinal beam 1. The draft is applied to the front transverse beam 2, the singletree 6, to which the horse is attached, having adjustable connection with the said beam 2, so as to regulate the side draft and permit the horse to walk to one side of the row being cultivated. The handles 7 are connected at their lower ends to a bracket 8, applied to the rear transverse beam 4 and are for the usual purpose.

A longitudinal beam 9, corresponding in length to the main beam 1, extends parallel therewith and has adjustable connection with the several transverse beams 2, 3, and 4. Side beams 10, extending parallel with the beams 1 and 9, have adjustable connection with the transverse beams 3 and 4 and are provided with standards bearing shovels which have a lateral inclination to act in opposition to the side draft resulting from hitching the team to the implement to one side of a medial line. The beams 1 and 9 are likewise provided with standards bearing shovels, the said standards being located in advance of the standards applied to the side beams 10, and the shovels of these standards also have a lateral inclination for the same purpose as the rear shovels. Any suitable means may be employed for adjustably connecting the longitudinal beams with the respective transverse beams, and, as shown, a pair of bolts 11 and a yoke-plate 12 are resorted to for attaing the desired end, the bolts of each pair coming upon opposite sides of the respective transverse beam and passing through the yoke-plate and the longitudinal beam opposite and adjacent to the yoke-plate. By loosening the bolts 11 the longitudinal beams can be adjusted laterally, and when the proper position is reached a retightening of the bolts will secure the beams in the adjusted position.

Each standard 13 is formed in the usual way and comprises side members which are spaced apart, the lower portion being bent to incline forwardly, thereby admitting of the main or upper portion occupying a nearly vertical position. The brace 14 inclines at an angle corresponding to the inclination of the lower portion of the standard, and its lower end has an extension 15, which passes between the side members of the standard and engages with the lower end thereof. A bolt 16 passes through an opening 17 at the lower end of the brace, between the side members of the standard, and through an opening in the shovel or plow-point 18, and secures the parts when assembled.

Having thus described the invention, what is claimed as new is—

1. In a cultivator, a main longitudinal beam, a series of transverse beams firmly and rigidly secured to the main longitudinal beam, a longitudinal brace parallel with the main beam and connecting the front transverse beam with the transverse beam immediately following, and having rigid connection with each, and a companion longitudinal beam having adjustable connection with the several transverse beams, substantially as and for the purpose set forth.

2. In a cultivator, a main longitudinal beam, a series of parallel transverse beams having firm and rigid connection with the main longitudinal beam, a longitudinal brace rigidly connecting the front transverse beam with the transverse beam immediately following, a companion longitudinal beam having adjustable connection with the series of transverse beams, and side beams having adjustable connection with the rear transverse beam and the transverse beam immediately preceding, substantially as set forth.

3. In combination, a standard comprising side members and having its lower end bent to incline forwardly, a brace having an extension at its lower end to enter the space between the side members of the standard, and a bolt passing through an opening in the brace, the space between the side members of the standard, and an opening in the shovel and connecting these parts, substantially in the manner set forth.

In testimony that I claim the foregoing as my own I have hereto affixed my signature in the presence of two witnesses.

WILLIAM BIBB.

Witnesses:
F. M. CROSS,
W. S. CROSS.